United States Patent

Jao et al.

[11] Patent Number: 5,578,235
[45] Date of Patent: * Nov. 26, 1996

[54] OVERBASED CALCIUM SULFONATE

[75] Inventors: Tze-Chi Jao; Jayne M. Vaccaro, both of Fishkill, N.Y.; William J. Powers, III, Port Arthur, Tex.

[73] Assignee: Ethyl Additives Corporation, Richmond, Va.

[ * ] Notice: The term of this patent shall not extend beyond the expiration date of Pat. No. 4,997,584.

[21] Appl. No.: 320,418

[22] Filed: Oct. 5, 1994

Related U.S. Application Data

[63] Continuation of Ser. No. 636,475, Dec. 31, 1990, abandoned.

[51] Int. Cl.⁶ .................................................. C10M 159/24
[52] U.S. Cl. ............................................................ 508/391
[58] Field of Search ................................... 252/18, 33

[56]  References Cited

U.S. PATENT DOCUMENTS 4,997,584  3/1991  Jao et al. .................................. 252/33

*Primary Examiner*—Jerry D. Johnson
*Attorney, Agent, or Firm*—Dennis H. Rainear

[57]  ABSTRACT

A method of preparing a calcium sulfonate having at least a TBN of 500 where the method comprises reacting CaO, Ca(OH)$_2$ and H$_2$O, and synthetic monoalkylbenzene sulfonate and synthetic dialkylbenzene sulfonate in certain molar ratios, respectively, for a sufficient length of time to produce the overbased calcium sulfonate.

8 Claims, No Drawings

OVERBASED CALCIUM SULFONATE

This is a continuation of application Ser. No. 07/636,475, filed on Dec. 31, 1990 now abandoned.

BACKGROUND OF THE INVENTION

This invention relates to overbased metal salts, and more particularly to an improved process for preparing overbased calcium sulfonates which are used as detergent and reserve alkalinity lubricating oil additives.

In the course of operation, internal combustion engines convert lubricating oil to acidic degradation products. Those acidic degradation products attack and corrode engine parts and catalyze the formation of sludge, thereby reducing lubricity and accelerating wear of moving parts in contact with the lubricating oil.

It is desirable to add basic substances to the lubricating oil which neutralize acids as they are formed in the engine before they reach concentrations sufficient to cause corrosion or to catalyze the sludge formation. Adding an alkalinity agent to the detergent in motor oil is known as overbasing. Colloidal carbonates of the alkaline earth metals have been found to be well suited for this purpose. These carbonate dispersions are stabilized by oil soluble surface active agents such as the sulfonates of the alkaline earth metals in which the sulfonic acid portion of the molecule has a molecular weight of preferably 350 to 600. The sulfonates are generally made by sulfonation of lubricating oil fractions from petroleum and/or by sulfonation of alkyl benzenes having the desired molecular weight for this purpose. Benzene alkylates with straight chain alkyl groups are especially desirable.

There is an increasing demand for an overbased sulfonate having at least a 500 TBN in the marine lubricant product market. Because of the higher TBN content, less dosage of this product is required in the additive treatment to obtain equivalent or better diesel engine performance. The current sulfonate overbasing process cannot produce an acceptable 500 TBN overbased sulfonate, because it produces either an insufficiently overbased, too viscous, or base oil-incompatible product. By modifying the current sulfonate overbasing process, a cost-effective improved process can make a fluid and base oil-compatible 500 TBN overbased calcium sulfonate that provides an effective protection to marine diesel engines.

In general, the process of preparing oils which contain overbased calcium sulfonates comprises reacting a solution of alkarylbenzene sulfonic acids having a molecular weight greater than 400, in oil with calcium oxide or hydroxide and bubbling carbon dioxide through the reaction mixture; thereby incorporating an excess of calcium carbonate into the calcium sulfonate which confers reserve alkalinity to the product.

Thus, it is an object of the present invention to provide a method of producing effective overbased calcium sulfonates that contain only amorphous calcium carbonate and have a TBN of at least 500.

DISCLOSURE STATEMENT

U.S. Pat. No. 4,997,584 discloses a method of preparing a calcium sulfonate having a TBN of 500 where the method comprises reacting CaO, $Ca(OH)_2$ and $H_2O$, and synthetic and petroleum sulfonates in certain molar ratios, respectively, for a sufficient length of time to produce the overbased calcium sulfonate.

U.S. Pat. No. 4,427,559 discloses that a mixture of calcium oxide and calcium hydroxide can be used in the overbased reaction to provide reserve alkalinity to neutral calcium sulfonates. It is reported that when mixtures containing up to 30 percent CaO are used, satisfactory products were obtained. When mixtures of 30 to 50 percent CaO were used, a gelatinous material which plugged the filter were obtained. Concentrations of CaO above 70 percent produced a fluid product containing finely divided particles which could not be filtered and were reflective of light. In this regard, the patent teaches the criticality of the ratio of the calcium oxide to calcium hydroxide in the absence of a promoter in producing acceptable product.

U.S. Pat. No. 4,604,219 discloses that calcium oxide may be used as the sole reserve alkalinity source in overbasing calcium sulfonates. This patent teaches, in the absence of a promoter, that water addition rate and amount are critical in producing a low solids content, filterable product.

U.S. Pat. No. 4,086,170 discloses that overbased calcium sulfonates are prepared by reacting a solution of alkylbenzene sulfonic acids with an excess of a calcium oxide having a medium or low activity toward water and with carbon dioxide. Improved overbasing and filterability of the overbased sulfonate solution were obtained by the use of a promoter for the conversion of the calcium oxide to calcium hydroxide. Recommended promoters include ammonia or organic bases such as monoamines or diamines, e.g. ethylene diamine.

U.S. Pat. No. 4,954,072 discloses a method of preparing a calcium sulfonate having a TBN of 325 where the method comprises reacting CaO, $Ca(OH)_2$ and $H_2O$ in certain molar ratios for a sufficient length of time to produce the overbased calcium sulfonate.

SUMMARY OF THE INVENTION

The present invention provides a process for preparing an improved overbased oil soluble calcium sulfonate having at least a TBN of 500. The process comprises:

(a) diluting a synthetic monoalkyl benzenesulfonate and a synthetic dialkylbenzene sulfonate in a molar ratio of synthetic monoalkyl benzene sulfonate to synthetic dialkylbenzene sulfonate of about 40:60 to about 55:45;

(b) adding to the diluted synthetic monoalkylbenzene sulfonate/synthetic dialkylbenzene sulfonate solution, CaO and $Ca(OH)_2$ in molar ratios of CaO: $Ca(OH)_2$ of about 90:10 to about 20:80 and a charge molar ratios of total lime [CaO and $Ca(OH)_2$]: sulfonate of about 22:1 to about 27:1;

(c) heating the sulfonate mixture to a temperature ranging from about 100° F. to about 170° F. under a pressure ranging from about 0 to about 50 psig;

(d) adding water to the heated sulfonate mixture in a molar ratio of CaO:$H_2O$ of about 0.15:1 to about 0.30:1;

(e) passing $CO_2$ into and through the heated sulfonate mixture for a period of about 60 to about 240 minutes;

(f) separating the solids from the liquid of the sulfonate mixture;

(g) adding a diluent oil to the $CO_2$ treated sulfonate mixture; and (h) stripping the hydrocarbon solvent from the resulting over-based oil soluble sulfonate product having at least a 500 TBN.

DETAILED DESCRIPTION OF THE INVENTION

According to the present invention, there is provided a new process for making an overbased sulfonate of at least a 500 TBN has been developed. A critical ratio between a synthetic monoalkylbenzene sulfonate and a synthetic dialkylbenzene sulfonate ratio in the sulfonate feedstock coupled with the use of a low molecular weight pale oil diluent is essential to make a fluid product. The lime to sulfonate charge ratio is crucial to achieve at least a 500 TBN overbased sulfonate, and the critical ratio of synthetic monoalkylbenzene sulfonate to synthetic dialkylbenzene sulfonate is essential to successfully produce a base oil-compatible product. This process produces a clear product with low solid waste.

In the present process for overbasing calcium sulfonates a mixture of water, calcium oxide and calcium hydroxide are reacted with a synthetic monoalkylbenzene sulfonate and a synthetic dialkylbenzene sulfonate in specified molar ratios. The entire charge of water is added before the carbonation of the sulfonate mixture in an amount of 15 to 30 mole % of the calcium oxide. A clear product with a low solid waste is produced.

It is known to produce overbased sulfonates by means of calcium oxide alone or a mixture of calcium oxide and calcium hydroxide. The previously known invention is distinguished in the recognition that the petroleum derived monoalkylbenzene sulfonate to synthetic dialkylbenzene sulfonate molar ratio is critical to effectively produce a base oil compatible product. The calcium oxide:sulfonate charge molar ratio is essential to produce a clear, low solids content of at least a 500 TBN overbased sulfonate.

According to the present invention the improvement provided is by using synthetic monoalkylbenzene sulfonates in conjunction with the use of petroleum-derived alkylarylsulfonates so that a wider range of monoalkylarylsulfonate can be utilized in the sulfonate feedstock to prepare a 500 TBN or higher TBN overbased sulfonate. Greater use of the monoalkylaryl-sulfonate enhances the compatibility of the highly overbased sulfonate in engine oil blends. The expanded range of sulfonate feedstock mixture composition provides an increased flexibility for lubricant formulation.

Overbased sulfonates derived from alkarylsulfonate feedstocks are one of the most commonly used detergents in automotive and marine engine oils. Depending on their applications, overbased sulfonates of different overbasing levels are prepared. As the overbasing level increases, the selection of alkarylsulfonate feedstock becomes more critical. There are two criteria for the selection: 1) the feedstock must give a fluid overbased product, and 2) it must produce an overbased product that is soluble in common base oils.

According to the present invention, it has been found that the viscosity and solubility of the final overbased product are greatly influenced by the alkylate structure of the alkarylsulfonate feedstocks disclosed in U.S. Pat. No. 4,997,584 which teaches the use of a blend of a petroleum-derived monoalkylarylsulfonate (commonly called petroleum sulfonate) sulfonate, which typically contains several cyclic rings including one or two aromatic rings and a long chain alkyl group, and a synthetic di ($C_{10}$–$C_{18}$) alkylbenzene sulfonate as the sulfonate feedstock to control the viscosity and solubility of the final overbased product. However, the use of petroleum sulfonate limits the range of petroleum sulfonate permissible between 25% and 35%. A higher amount of either petroleum-derived or synthetic monoalkylarylsulfonate is often desirable since it improves solubility in oils and offers greater flexibility for lubricant formulation.

Also, it has now been found that a synthetic heavy linear alkylbenzene sulfonate ($C_{16}$–$C_{26}$) can extend the range of monoalkylarylsulfonate in the sulfonate feedstock for the preparation of 500 TBN or higher overbased sulfonate from 25–35% to 25–55%. A wider range of monoalkarylsulfonate permissible in the sulfonate feedstock increases the flexibility for lubricant formulation and improves the compatibility of the product with base oils.

The advantages of the present invention are more clearly apparent when considering the following examples and results thereof.

EXAMPLE I

A blend containing 7.55 g of synthetic monoalkylbenzene sulfonic acid (obtained from Enimont as MAPS), 15.44 g synthetic dialkylbenzene sulfonate, 5.89 g pale oil, 91.0 g n-heptane, 7.9 g methanol, and 0.086 g calcium chloride was brought to reflux in a 500 ml reaction flask for 15 minutes. To neutralize, 0.88 g calcium hydroxide was added and allowed to mix for 30 minutes at 50° C. After neutralization, 12.79 g calcium oxide and 11.27 g calcium hydroxide was charged, and the reaction temperature was increased to 60° C. At this point, 1.10 ml water was added, and carbon dioxide was immediately introduced, at a rate of 40 ml/minute, for 135 minutes.

The filtered and solvent-stripped final product had a TBN value of 509/513. Its infrared spectrum showed a symmetric band with a frequency maximum at 865 cm(−1), indicating amorphous calcium carbonate.

EXAMPLE II

A blend containing 45.30g of synthetic monoalkylbenzene sulfonic acid (obtained from Enimont as MAPS), 92.64 g synthetic dialkylbenzene sulfonate, 35.34 g pale oil, 798.00 ml n-heptane, 47.40 g methanol, and 0.516 g calcium chloride was brought to reflux in a 3 liter reaction flask for 15 minutes. To neutralize 5.28 g calcium hydroxide was added and allowed to mix for 30 minutes at 50° C. After neutralization, 76.74 g calcium oxide and 67.62 g calcium hydroxide was charged, and the reaction temperature was raised to 60° C. At this point, 6.6 ml water was added, and carbon dioxide was immediately introduced at a rate of 250 ml/minute for 135 minutes.

The filtered and solvent-stripped final product had a TBN (ASTM D2896) value of 528.4. X-ray fluorescence showed the product to be 20.9% calcium. Its infrared spectrum showed a symmetric band with a frequency maximum at 865 cm(−1), indicating amorphous calcium carbonate.

EXAMPLE III

A blend containing 3.1 lbs of synthetic monoalkylbenzene sulfonic acid (obtained from Enimont as MAPS), 8.7 lbs synthetic dialkylbenzene sulfonate, 38 lbs heptane, 2.2 lbs 100 P pale oil, 5.6 lbs methyl alcohol, and 0.56 lb calcium hydroxide was brought to reflux (57° C.) in a 10-gallon reactor. The reaction mixture was refluxed and stirred at 55°–60° C. for one hour to neutralize the sulfonic acid. After neutralization, the reaction mixture was cooled to 40° C.

Then 6.4 lbs calcium oxide, 5.6 lbs calcium hydroxide, 25 grams calcium chloride and 0.5 lb water were added. The temperature of the reaction mixture was raised to 60° C. and added a total of 6.6 lbs $CO_2$ at a constant rate over a period of 3 hours.

The crude product was filtered at 40° C. Stripped the solvents at 120° C. The stripped filtrate had 575 TBN. An appropriate amount of 100 P pale oil was added to obtain a final 500 TBN finished product. The finished product was clear and had a kinematic viscosity of 82 cSt at 100° C.

The effects of petroleum-derived and synthetic monoalkylaryl-sulfonates are summarized below in TABLE I.

TABLE I

Effects of Petroleum-Derived and Synthetic Monoalkylarylsulfonates On The Final Product's Kinematic Viscosity And Its Compatibility With Base Oils

| | Petroleum-Derived Product | | Synthetic-Derived Product | |
|---|---|---|---|---|
| Content of Mono-alkylaryl Sulfonate % | Kin Vis (1) at 100° C. (cSt) | Compatibility with Bright Stock Base Oil | Kin Via (1) at 100° C. (cSt) | Compatibility With Bright Stock Base Oil |
| 18.5 | 74.9 | haze | — | — |
| 20.0 | — | Slightly haze | | |
| 25.0 | — | Soluble | | |
| 30.0 | 164.2 | Soluble | | |
| 35.0 | 206.0 | Soluble | | |
| 40.0 | 206.0 | Soluble | — (2) | Soluble |
| 50.0 | | | 32 | Soluble |
| 55.0 | | | less than 200 | Soluble |

(1) The kinematic viscosities at 100° C. were obtained from products made by a 10-gallon reactor.
(2) The kinematic viscosity was estimated to be between 50 and 80.

We claim:

1. A process for producing an overbased oil soluble calcium sulfonate having a TBN of at least 500 and a viscosity of less than 200 cSt at 100° C., said process consisting essentially of
   (a) diluting a synthetic mono ($C_{16}$–$C_{26}$) alkylbenzene sulfonate and a synthetic di ($C_{10}$–$C_{18}$) alkylbenzene sulfonate with a hydrocarbon solvent in a molar ratio of synthetic monoalkyl benzene sulfonate to synthetic dialkylbenzene sulfonate of about 40:60 to about 55:45;
   (b) adding to the diluted synthetic monoalkylbenzene sulfonate/synthetic dialkylbenzene sulfonate solution, CaO and $Ca(OH)_2$ and $H_2O$ in molar ratios of CaO: $Ca(OH)_2$ of about 90:10 to about 20:80 and a charge molar ratios of total lime: sulfonate of about 22:1 to about 27:1;
   (c) heating the mixture of step (b) to a temperature of about 100° F. to about 170° F. under a pressure ranging from about 0 to about 50 psig;
   (d) adding water to said heated mixture of step (c) in a molar ratio of CaO:$H_2O$ of about 0.15:1 to about 0.30:1;
   (e) passing $CO_2$ into and through said heated mixture of step (d) for a period of about 60 to about 240 minutes;
   (f) separating the solid from the liquid product of the mixture of step (e);
   (g) adding a pale oil diluent to the liquid product of step (f); and
   (h) stripping the hydrocarbon solvent from the resulting over-based oil soluble sulfonate product having at least a TBN of 500 wherein the product contains from 25–55% of the synthetic monoalkyl benzenesulfonate.

2. The process of claim 1 wherein the molar ratio of $H_2O$:CaO ranges from about 0.2:1 to about 0.3:1.

3. The process of claim 1 wherein the charge molar ratio of total lime sulfonate ranges from about 23:1 to about 25:1.

4. The process of claim 1 wherein the hydrocarbon solvent is selected from the group consisting of a ($C_5$–$C_{15}$) alkane, toluene, xylene and naphthalene.

5. The process of claim 4 wherein said alkane is heptane.

6. The process of claim 1 wherein the $CO_2$ is passed into the sulfonate mixture for a period ranging from about 60 to about 180 minutes.

7. The process of claim 1 wherein the solid waste volume ranges from about 10.0 percent to about 25.0 percent.

8. The process of claim 7 wherein the solid waste volume is about 20 percent.

* * * * *